(12) United States Patent
Amaral et al.

(10) Patent No.: US 6,467,774 B1
(45) Date of Patent: Oct. 22, 2002

(54) AXIALLY PRESSURE BALANCED FLOATING SEAL SYSTEM

(75) Inventors: Antonio M. Amaral, East Providence; Stanley J. Olson, Newport, both of RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 38 days.

(21) Appl. No.: 09/652,303

(22) Filed: Aug. 28, 2000

(51) Int. Cl.$^7$ ................................................ F16J 15/16
(52) U.S. Cl. ...................................................... 277/579
(58) Field of Search ................................ 277/579, 580, 277/551, 572, 500, 559, 563, 384, 549, 372, 573, 571, 565, 562, 313

(56) References Cited

U.S. PATENT DOCUMENTS

| | | | | |
|---|---|---|---|---|
| 2,186,537 A | * | 1/1940 | Salisbury | 277/508 |
| 4,174,672 A | * | 11/1979 | Cox | 277/563 |
| 4,408,766 A | * | 10/1983 | Paech | 277/422 |
| 4,448,425 A | * | 5/1984 | von Bergen | 277/545 |
| 5,039,115 A | * | 8/1991 | Hebert et al. | 277/347 |
| 6,261,069 B1 | * | 7/2001 | Djordjevic | 417/313 |

FOREIGN PATENT DOCUMENTS

BE          000086002 A1  *  8/1983

* cited by examiner

Primary Examiner—Anthony Knight
Assistant Examiner—Michael Wayne White
(74) Attorney, Agent, or Firm—Michael J. McGowan; James M. Kasischke; Michael R. Oglo

(57) ABSTRACT

A pressure balanced floating seal system positioned within a structure about a rotating shaft. The floating seal system has a cylindrical outer seal housing having a cylindrical internal recessed region formed in the outer seal housing with a retaining flange extending into said internal recessed region. A cylindrical inner seal housing is positioned within the internal recessed region. The inner seal housing has an annular internal surface for accommodating the rotating shaft. Two sealing member retaining grooves are formed in the inner seal housing annular internal surface and a lubricant recess is formed between the two grooves. An intermediate seal is retained on the forward side of the inner seal housing forward face between the inner seal housing and the outer seal housing at the retaining flange. Sealing members are positioned in the sealing member retaining grooves at substantially the same radius as the intermediate seal.

12 Claims, 7 Drawing Sheets

AXIALLY PRESSURE BALANCED FLOATING SEAL SYSTEM

CROSS-REFERENCE TO RELATED PATENT APPLICATION

This patent application is co-pending with two related patent applications filed on the same date, entitled: COMPACT DRIVE SHAFT FLOATING SEAL SYSTEM, and RADIALLY PRESSURE BALANCED FLOATING SEAL SYSTEM, both having the same inventors as this patent application.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field Of The Invention

The present invention relates to sealing assemblies used on rotating shafts and more particularly, relates to an axially pressure balanced floating seal system used on a drive shaft.

(2) Description Of The Prior Art

O-ring seals are commonly used to seal rotating shafts used in vehicles or machinery. For example, in an existing torpedo tail cone assembly 10, FIG. 1, the drive shaft 12 of the torpedo is typically sealed with an O-ring seal system having a seal housing 14 and an O-ring seal 15 within a groove in an internal annular surface of the housing 14. The seal housing 14 is located within the tail cone housing 16 near the bearing 18. When the torpedoes have stable and concentric shaft bearing mounts relative to the seal, non-floating seal housings can be used, and these housings will still maintain reasonable clearance to prevent rubbing between the shaft 12 and the seal housing 14. Larger shafts that are mounted soft enough to move or float relative to the seal housing require floating seal housings. The floating seal housing moves with the drive shaft 12 generally in a radial direction as indicated by arrow 2 maintaining clearance of the shaft 12 and preventing the shaft 12 from rubbing against the seal housing 14.

In order to allow greater torpedo reliability and operations at depth, replacement of the prior art seal described above was proposed. If a larger envelope is available for a seal, an axially pressure balanced floating seal system could be implemented to allow radial movement of the drive shaft. The seal should also be operative at greater pressures while the drive shaft is rotating at operational speeds.

SUMMARY OF THE INVENTION

One object of the present invention is a high pressure, dynamic seal system that moves radially with the drive shaft at all operating pressures.

Another object of the present invention is a high pressure seal system fitting that can be used in current systems with only minor modifications.

A further object of the present invention is a reliable high pressure seal system in which the sealing members are effectively lubricated.

Accordingly, the present invention provides an axially pressure balanced floating seal system positioned within a structure about a rotating shaft. The floating seal system has a cylindrical outer seal housing with a cylindrical internal recessed region formed therein. A retaining flange extends radially from the housing into the internal recessed region. A cylindrical inner seal housing is positioned within the internal recessed region. The inner seal housing has an annular internal surface for accommodating the rotating shaft. Two sealing member retaining grooves are provided in the annular internal surface and a lubricant recess or oil gallery is formed between the two grooves. An intermediate seal is retained on the inner seal housing forward face between the inner seal housing and the outer seal housing at the retaining flange. Sealing members are positioned in the sealing member retaining grooves at substantially the same radius as the intermediate seal.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
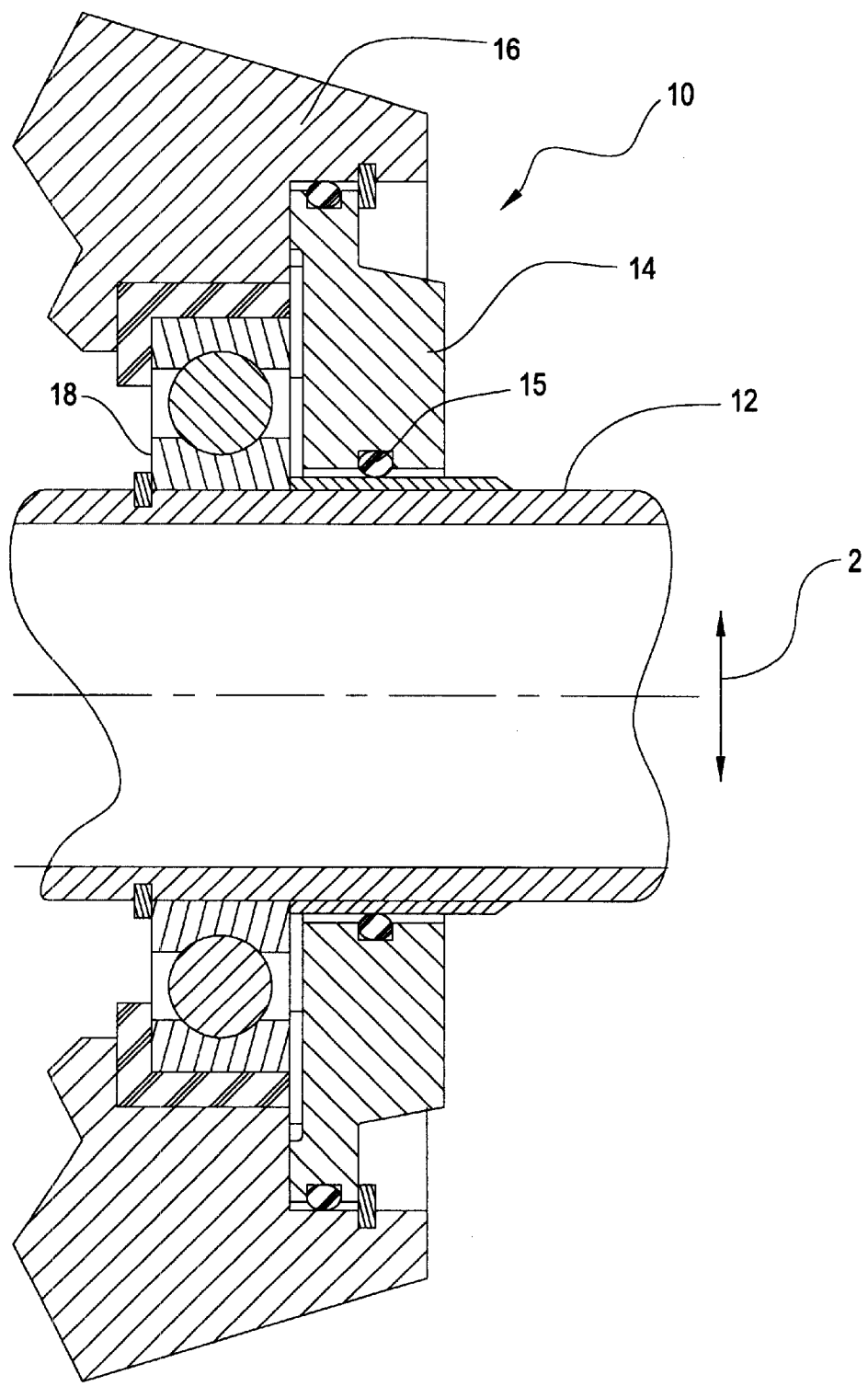
FIG. 1 is a cross-sectional view of a torpedo tail cone assembly having an O-ring seal system for sealing a drive shaft according to the prior art.
Figure 2:
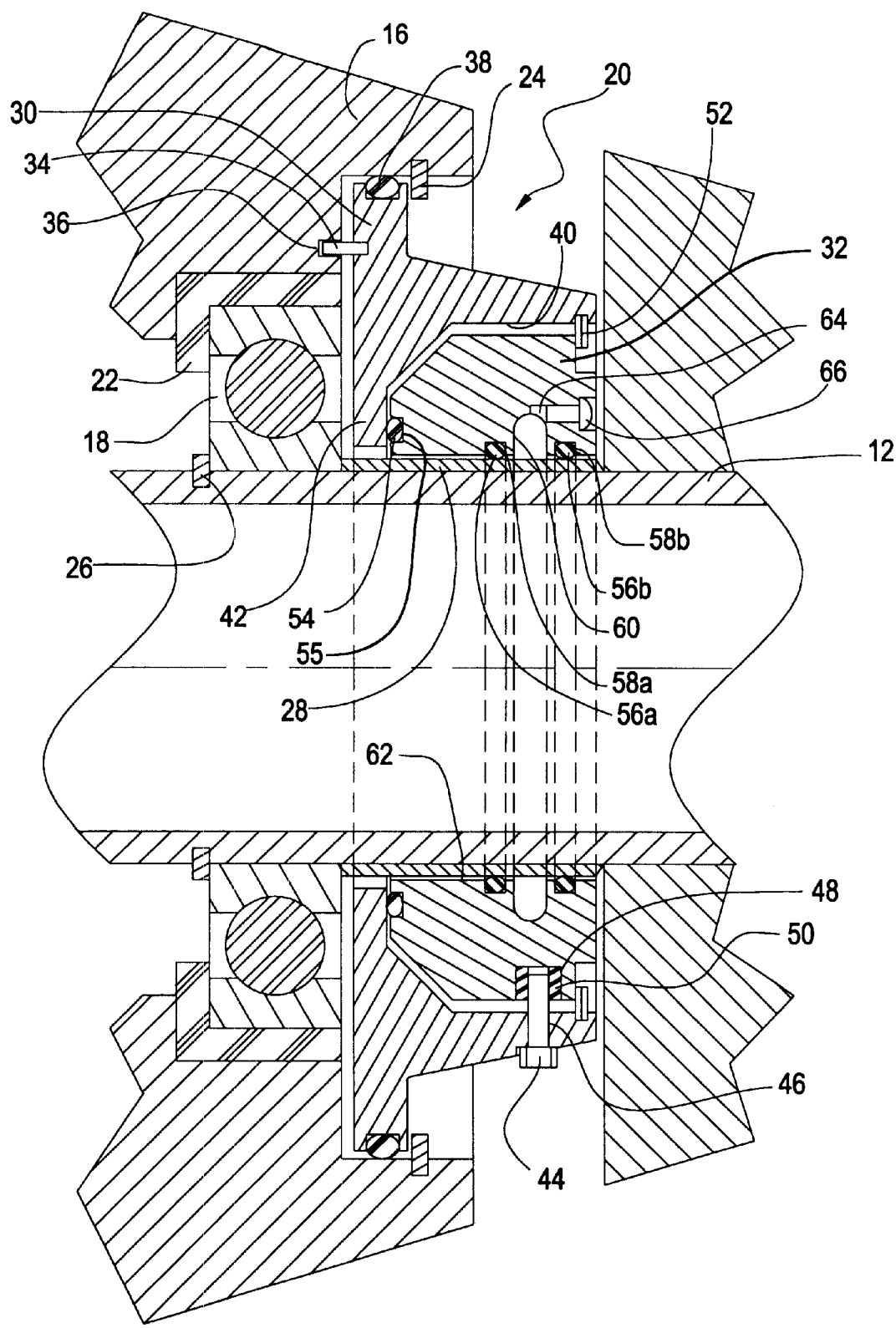
FIG. 2 is cross-sectional view of a substantially pressure balanced floating seal system according to a first embodiment of the present invention.

FIG. 2 shows a compact drive shaft floating seal system, according to the present invention, is used to seal a rotating shaft 12 while allowing movement of the shaft in a radial direction 2 at operating pressure differentials. In this example, the floating seal system 20 is assembled in a tail cone housing 16 of a torpedo proximate the shaft bearings 18, which are preferably mounted in a resilient elastomer 22. In reference to this and other drawings, the direction toward the tail cone will be referred to as "forward", the direction away from the tail cone as "aft", the direction upward or downward away from the center as "outward" and the direction toward the center as "inward". The floating seal system 20 is held in place by a spiral ring 24 or other similar retaining member or mechanism, and the bearings 18 are held in place by a retaining ring 26 or other similar retaining member or mechanism. A seal ring 28 made of ground and polished in place, hard, chrome-plated, stainless steel or alternative compatible material is preferably disposed around the shaft 12 between the shaft 12 and the floating seal system 20. Seal ring 28 is preferably statically sealed on shaft 12 with a radial O-ring. The present invention contemplates other uses for the floating seal system 20 in other types of vehicles or with rotating shafts in other types of machines.

The floating seal system 20 includes an outer seal housing 30 and an inner seal housing 32 that floats in a radial direction relative to the outer seal housing 30. Outer seal housing 30 and inner seal housing 32 are preferably made of anodized aluminum or other compatible material, and the radial wall thickness of the inner seal housing 32 is in the range of about 0.6 inches depending on the application. One or more pins 34 or other similar members extend from the outer seal housing 30 to a pocket 36 in the tail cone housing 16 to prevent rotation of the outer seal housing 30 relative to the tail cone housing 16. An outer O-ring 38 or other type of sealing member is preferably placed between the outer seal housing 30 and the tail cone housing 16.

The outer seal housing 30 includes an internal recessed region 40, for receiving the inner seal housing 32, such that the outer and inner seal housings 30, 32 form a shaft receiving aperture that receives the rotating shaft 12. Inner seal housing 32 is nested against a retaining flange 42 extending radially inward into recessed region 40. A torque bolt 44 positioned in an outer torque bolt aperture 46 formed in outer seal housing 30 joins inner seal housing 32 in an inner torque bolt aperture 48. A minimum of two torque bolts 44 are necessary to minimize side loads on inner seal housing 32. An elastomeric bushing 50 positioned in inner torque bolt aperture 48 prevents transfer of vibrations from inner seal housing 32 to outer seal housing 30. A clearance present between torque bolt 44 and the base of inner torque bolt aperture 48 allows radial movement of inner seal housing 32. The inner seal housing 32 is preferably retained within the outer seal housing 30 with a retaining ring 52 positioned within a groove in the wall of recessed region 40; however, another similar retaining member or mechanism can be used for this purpose. Inner seal housing 32 is sealed against outer seal housing 30 retaining flange 42 by an intermediate O-ring 54 positioned in an intermediate seal retaining groove 55. Inner seal housing 32 can be removed from outer seal housing 30 without removing outer seal housing from tail cone housing 16 by removing retaining ring 52 and torque bolt 44.

Inner seal housing 32 is sealed against seal ring 28 by two O-rings 56a and 56b housed within O-ring grooves 58a and 58b. Preferably, only the O-rings 56 a, 56 b touch the seal ring 28 around the shaft 12. A lubricant recess 60 is disposed between O-ring grooves 58a and 58b formed within an internal annular surface 62 of the inner seal housing 32 for containing oil or other lubricant. A first hole 64 is used to inject the oil into the recess 60 (e.g., to about 60 to 70% full) and is sealed with a self sealing plug 66 or other sealing mechanism. A second hole (not shown) can also be provided for venting during filling through the first hole 64.

Seal system 20 is expected to be used in a pressurized environment where the pressure external to the seal system 20 exceeds the pressure within tail cone 16. At all but extreme pressures, inner seal housing 32 will align itself with seal ring 28 on shaft 12 by radially repositioning itself. At extremely high pressure differentials the inner seal housing 32 will be pushed forward and grounded against retaining flange 42 by the small region of inner seal housing 32 within intermediate O-ring 54 and outside the sealing radius of O-ring 56b. Because inner seal housing 32 is subjected to high pressure on its aft face, outside surface and most of its forward face, the force on the inner seal housing 32 is this small region multiplied by the pressure differential. The pressure differential causing this grounding is dependent on the stiffness of intermediate O-ring 54 and the axial spacing between inner seal housing 32 and outer seal housing 30. During alignment, O-rings 56a and 56b touch the seal ring 28 and slide inner seal housing 32 radially until properly positioned. Radial self-positioning of housing 32 allows shaft 12 and seal assembly 20 to be manufactured with looser tolerances and limits potential contact between inner seal housing 32 and seal ring 28.

Figure 3:
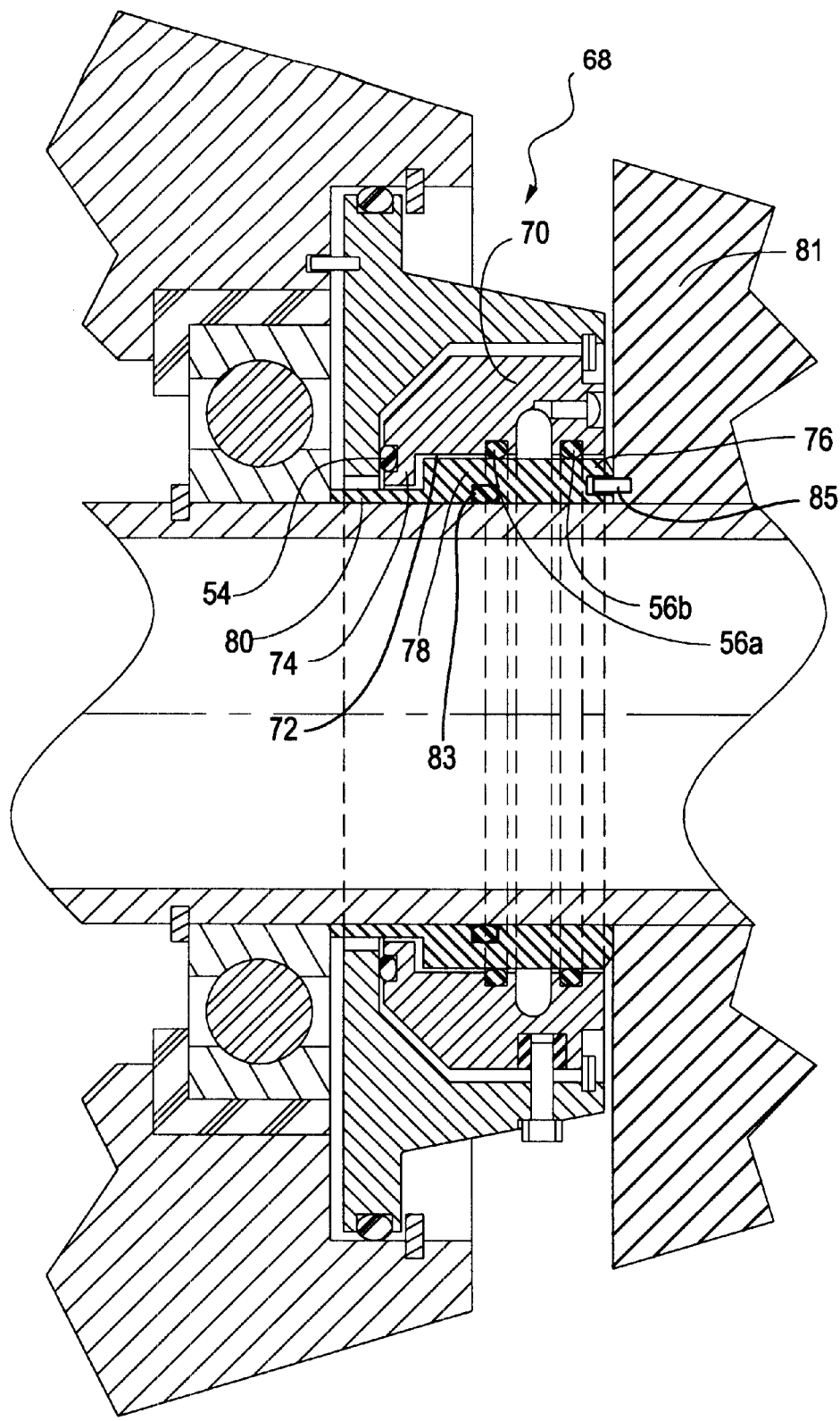
FIG. 3 is cross-sectional view of a pressure balanced floating seal system according to a second embodiment of the present invention.
Figure 4:
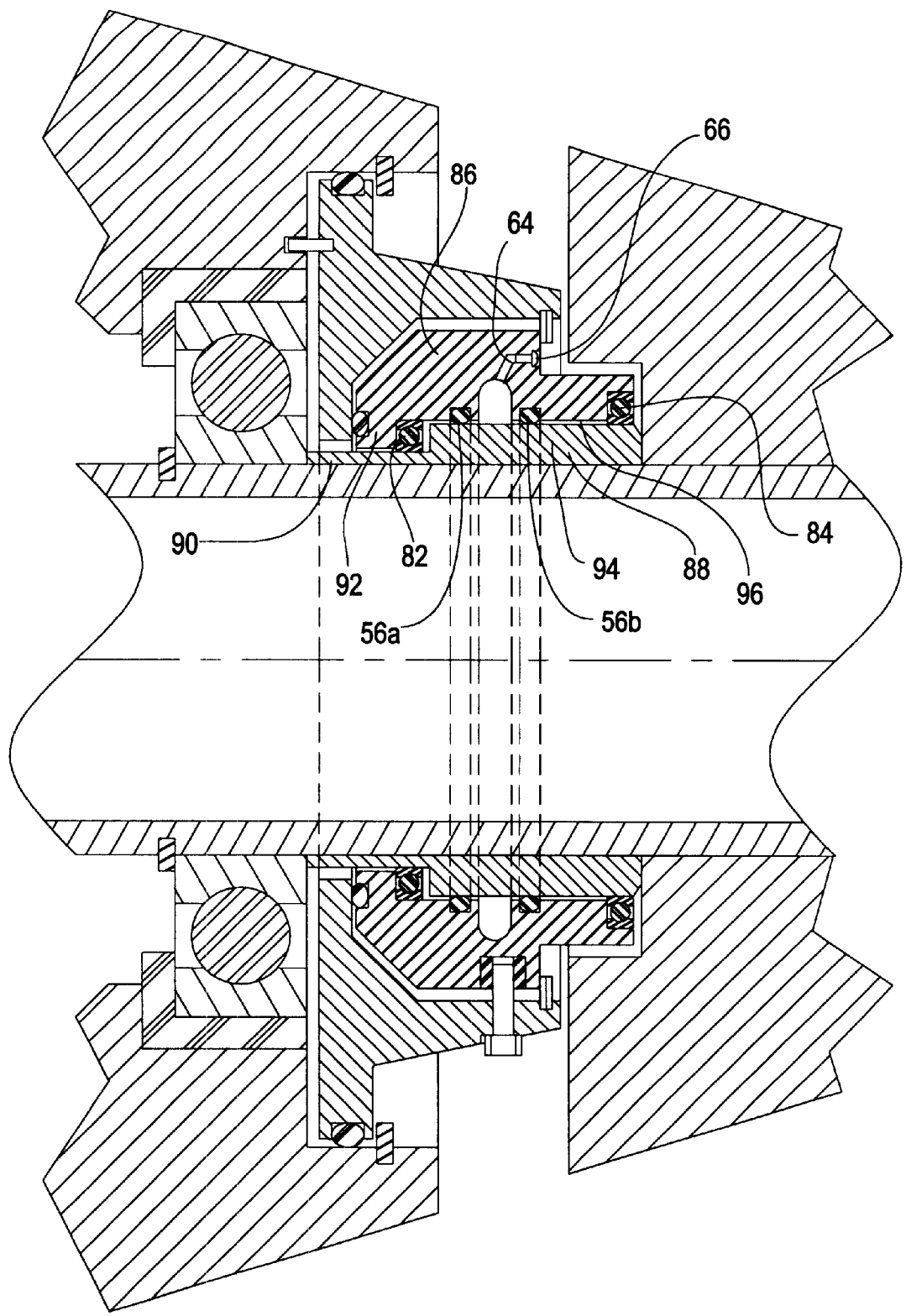
FIG. 4 is cross-sectional view of a pressure balanced floating seal system according to a third embodiment of the present invention.
Figure 5:
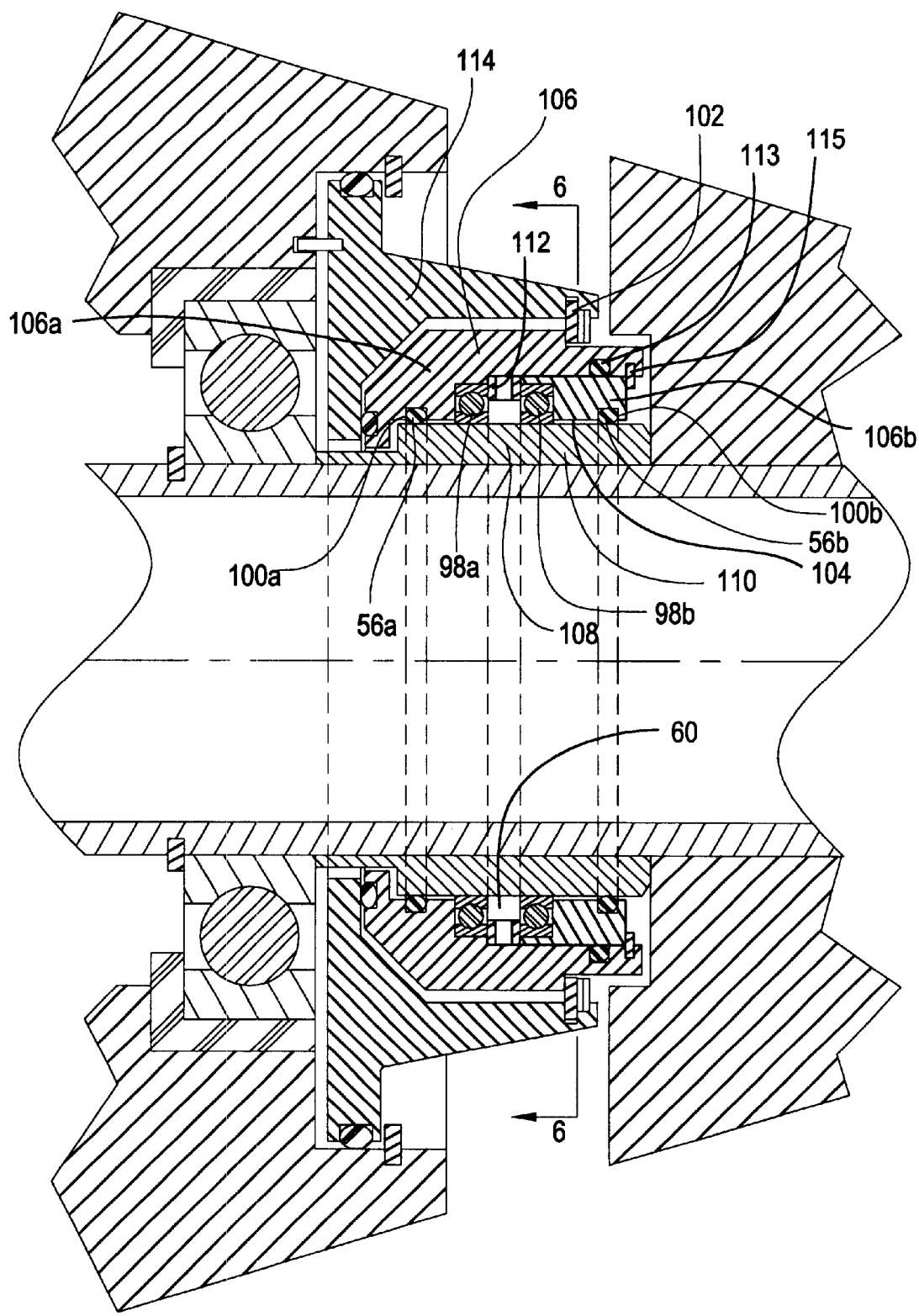
FIG. 5 is cross-sectional view of a pressure balanced floating seal system according to a fourth embodiment of the present invention.

FIGS. 3–5 show alternate embodiments of the invention having many parts which are the same or extremely similar to those in the first embodiment. These parts will share the same reference numbers. Altered parts will be given new reference numbers.

FIG. 3 shows a second embodiment of the invention having a fully pressure balanced floating seal system 68. Inner seal housing 70 has an internal annular surface 72 having a greater diameter. A sealing flange 74 extends radially inward to a smaller diameter than internal annular surface 72. Sealing ring 76 has sealing section 78 having an increased diameter and a collar 80 having a reduced diameter. Sealing flange 74 is positioned about collar 80, and internal annular surface 72 is positioned about sealing section 78.

Intermediate O-ring 54 is positioned to create a seal at substantially the same diameter as the seal created by O-rings 56a and 56b. This results in a pressure balanced seal because inner seal housing 70 has the same force on one face as on the other face.

Assembly of this embodiment is more complex because the inner diameter of inner seal housing 70 is smaller than seal ring 76. The propeller hub 81 and seal ring 76 must be removed before inner seal housing 70 can be removed from shaft 12 in an aft direction. Typically, seal ring 76 is shrunk on shaft 12 by thermal shrink fitting and it is not removable. This embodiment provides a removable seal ring 76, that is statically sealed to shaft 12 by O-ring 83. Seal ring 76 is prevented from rotating relative to shaft 12 by pin 85. Although these features are not shown in other embodiments, they can be incorporated allowing easier assembly and disassembly.

FIG. 4 shows a third embodiment of the floating seal system of the current invention. This embodiment features pilot bearings 82 and 84 positioned outside O-rings 56a and 56b. In order to accommodate the bearings, inner seal housing 86 is provided with a greater axial length. Likewise, seal ring 88 has additional length. Because of the increased length of housing 86, first hole 64 and sealing plug 66 are repositioned and resized.

First pilot bearing 82 is mounted between seal ring 88 at collar 90 and inner seal housing 86 at sealing flange 92. Second pilot bearing 84 is mounted between seal ring 88 sealing section 94 and internal annular surface 96 of inner seal housing 86. Pilot bearings 82 and 84 can be any known kind of bearing capable of withstanding the forces necessary to float inner seal housing 86. These can be ball bearings, roller bearings, journal bearings or the like which are lubricated or sealed as desired.

FIG. 5 shows a fourth embodiment of the floating seal system having pilot bearings 98a and 98b mounted between O-rings 56a and 56b. Because bearings 98a and 98b are located between O-rings 56a and 56b, they will be lubricated by the oil in the lubrication recess. O-ring grooves 100a and 100b are positioned further apart to accommodate pilot bearings 98a and 98b. This embodiment also provides a tab ring 102 which will be discussed with relation to FIG. 6.

O-ring grooves 100a, 100b and O-rings 56a, 56b are positioned at the extremities of internal annular surface 104 of inner seal housing 106. Pilot bearings 98a and 98b are positioned on each side of lubrication groove 60 and mounted between internal annular surface 104 and seal ring 108 sealing section 110. In order to position bearings 98a and 98b within inner seal housing 106, the housing must be manufactured in two pieces, an inner seal housing body 106a and an inner seal housing insert 106b spacer 112 is positioned within lubrication groove 60 to prevent insert 106b from moving axially within inner seal housing body 106a, and a body sealing O-ring 113 is positioned between body 106a and insert 106b preventing leakage therebetween. A insert retaining ring 115 is positioned in a groove formed in body 106a for preventing axial motion of insert 106b out of body 106a.

Figure 6:
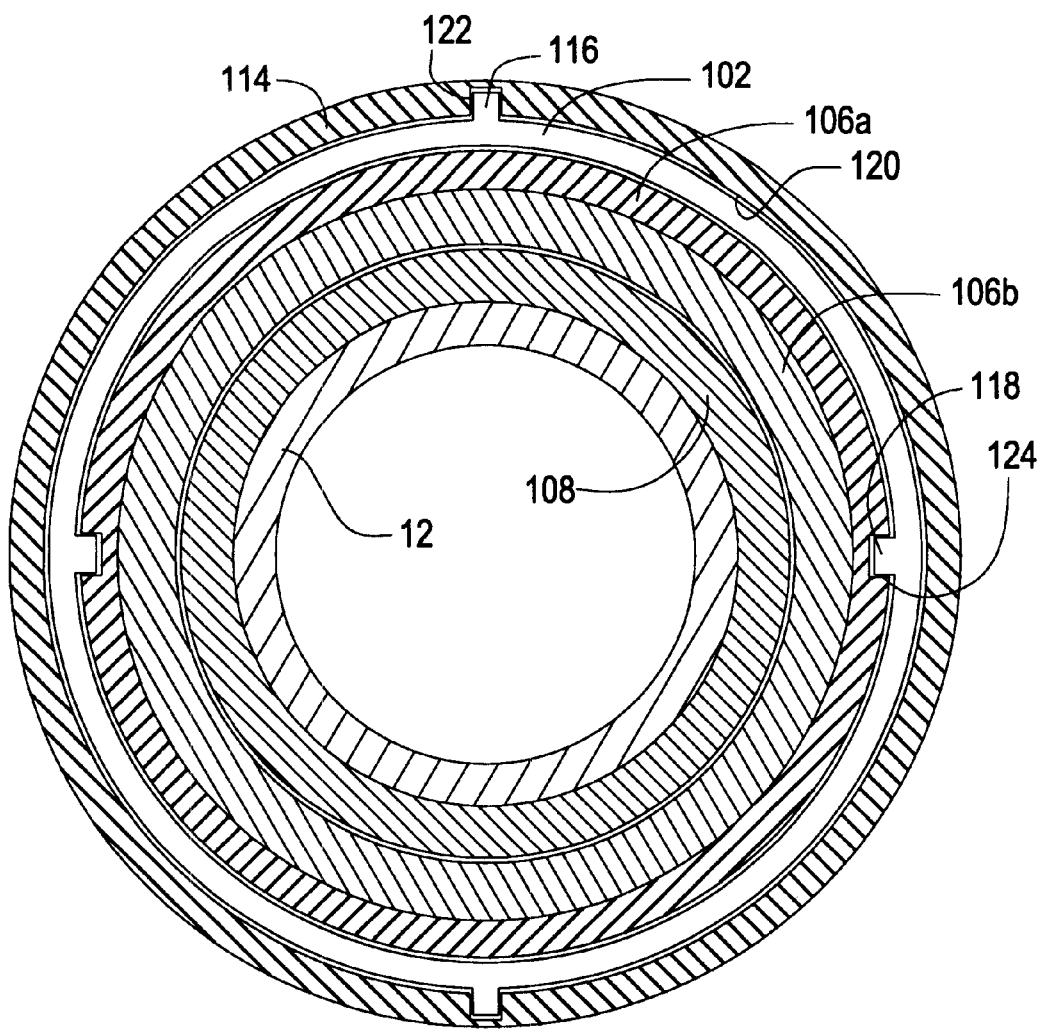
FIG. 6 is an end view of a seal system having a tab ring taken along line 6—6 of FIG. 5.

Referring additionally to FIG. 6, tab ring 102 is provided between inner seal housing 106 and outer seal housing 114 in order to prevent rotation and permit radial repositioning of inner seal housing 106. Tab ring 102 is a circular band preferably having two outer tabs 116 extending radially outward and two inner tabs 118 extending radially inward. Outer seal housing 114 has an outer tab ring groove 120 formed therein having outer tab pockets 122 arrayed therein corresponding to outer tabs 116. Outer tab pockets 122 are in communication with the aft face of outer seal housing 114 to allow insertion of tab ring 102 before insertion of retaining ring 52 into groove. Inner seal housing 106 has a plurality of inner tab pockets 124 formed therein and arrayed about the outer surface corresponding to inner tabs 118. A gap is provided between the tabs and the bases of the pockets to allow radial movement of inner seal housing 106 within outer seal housing 114. A similar gap is also provided between the tab ring body and the inner and outer surfaces of the respective housings. Another number of tabs 116 and 118 can be provided, but a circumferential gap must exist between tabs 116 and 118 and pockets 122 and 124 to allow floating of tab ring 102. The transmission of circumferential forces by tab ring 102 prevents inner seal housing 106 from rotating with respect to outer seal housing 114. Tab ring 102 can be provided on other embodiments as a replacement to torque bolt 44.

Figure 7:
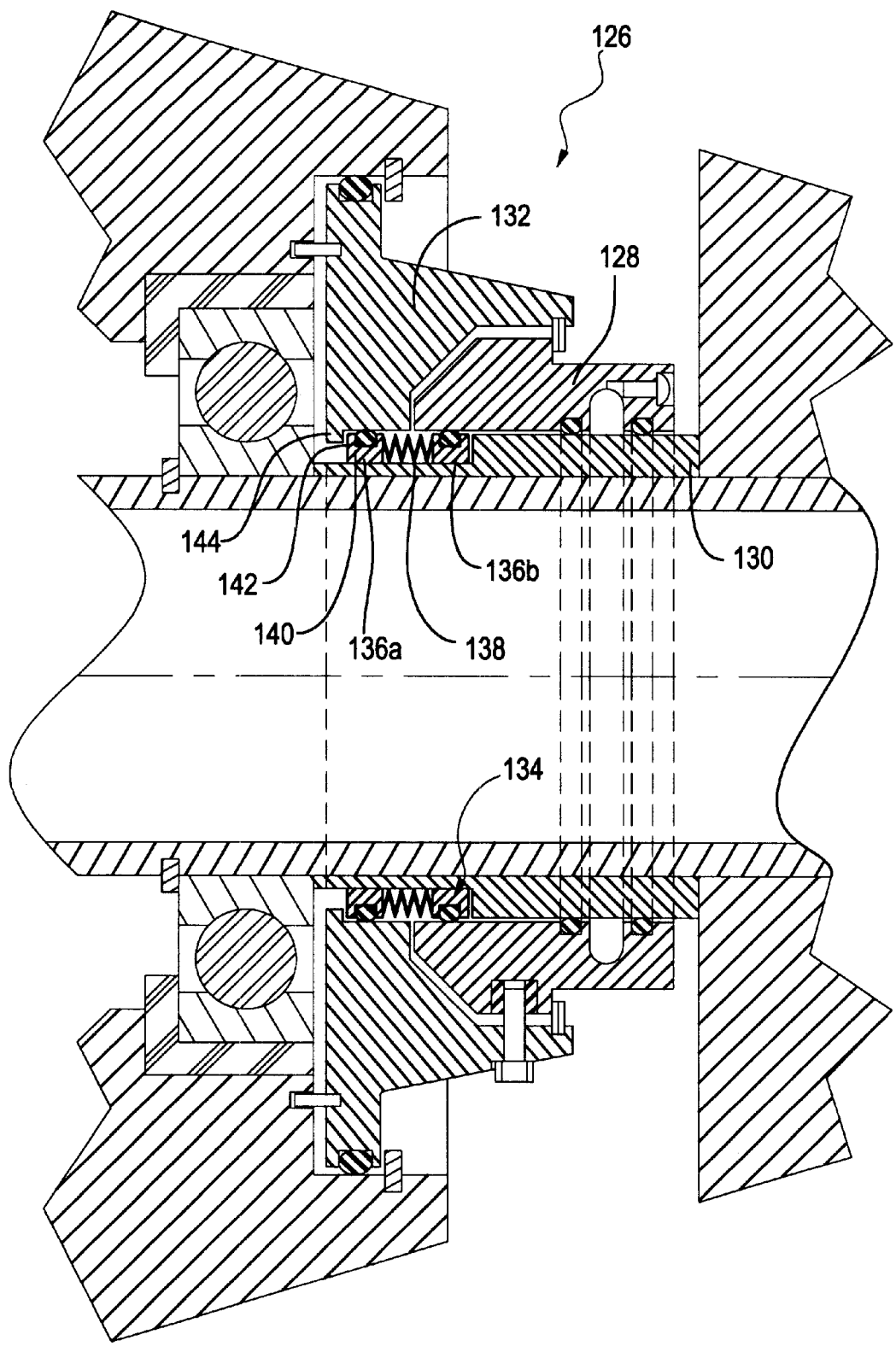
FIG. 7 is cross-sectional view of a pressure balanced floating seal system according to a final embodiment of the present invention.

FIG. 7 shows a final embodiment of the floating seal system 126 having a fully pressure balanced dynamic seal system that does not employ a face seal such as seal 54 of FIG. 3. In this embodiment, inner seal housing 128 does not extend within the outer radius of sealing ring 130, and inner seal housing 128 can be removed without removing sealing ring 130. In order to seal the space between outer seal housing 132 and inner seal housing 128, a sealing tube 134 is statically mounted on sealing ring 130. Sealing tube 134 includes a forward seal 136a, an aft seal 136b, and a flexible member 138 joining the two seals. The forward and aft seals each have a ring shaped mount 140 with an O-ring 142 positioned therein. Flexible member 138 is joined at its forward end to the forward ring shaped mount 140 and at its aft end to the aft ring shaped mount 140. Flexible member 138 is shown as an accordion pleated tube, but another longitudinally flexible structure can be used. The longitudinally flexible attribute of the structure allows variation in the space between sealing ring shoulder and outer seal housing. Outer seal housing 132 is provided with an inner radial flange 144 for retaining sealing tube 134.

In light of the above, it is therefore understood that within the scope of the appended claims, the invention may be practiced otherwise than as specifically described.

What is claimed is:

1. A pressure balanced floating seal system positioned within a structure about a rotating shaft, comprising:
    a cylindrical outer seal housing positioned within the structure, said outer seal housing having a cylindrical internal recessed region formed therein and a retaining flange extending into said internal recessed region;
    a cylindrical inner seal housing having a forward face, an aft face and an annular internal surface defining a shaft aperture through said inner seal housing, said inner seal housing being positioned within said outer seal housing internal recessed region with said inner seal housing forward face being positioned proximate said outer seal housing retaining flange, said inner seal housing forward face having an intermediate seal retaining groove formed therein, said inner seal housing annular internal surface having a lubricant recess formed therein and thereabout, and at least two sealing member retaining grooves formed in said inner seal housing annular internal surface with one sealing member retaining groove formed axially forward of said lubricant recess and one sealing member retaining groove formed axially aft of said lubricant recess;
    a circular intermediate seal having a first sealing radius from the axis of the rotating shaft and being retained by said intermediate seal retaining groove on said inner seal housing forward face between said inner seal housing and said outer seal housing at said retaining flange, said circular intermediate seal preventing leakage of higher pressure environmental fluid from said aft face of said cylindrical inner seal housing into a lower pressure region forward of said cylindrical intermediate seal housing; and
    at least two sealing members with each sealing member being positioned in one said sealing member retaining groove, said sealing members having a second sealing radius from the axis of the rotating shaft and said second-sealing radius being substantially the same as said first sealing radius, said at least two sealing members preventing leakage of higher pressure environmental fluid from said aft face of said cylindrical inner seal housing into the lower pressure region forward of said cylindrical intermediate seal housing.

2. The system of claim 1 further comprising a sealing ring fixed on the rotating shaft, said inner seal housing being positioned about said sealing ring and said at least two sealing members sealing against said sealing ring.

3. The system of claim 2 wherein:
    said sealing ring has a collar having a third radius to the forward end of said sealing ring and a sealing section having a fourth radius to the aft end of said sealing ring;
    said inner seal housing has a sealing flange extending inward from the forward face of said inner seal housing toward said sealing ring collar;
    said intermediate seal being positioned on said inner seal housing sealing flange; and
    said at least two sealing members being positioned within said inner seal housing sealing member retaining grooves in contact with said sealing ring sealing section.

4. The system of claim 3 further comprising at least one pilot bearing joined between said inner seal housing annular internal surface and said sealing ring.

5. The system of claim 4 wherein said at least one pilot bearing is joined between said inner seal housing annular internal surface and said sealing ring and axially between said lubricant recess and one sealing member.

6. The system of claim 4 wherein said at least one pilot bearing is joined between said inner seal housing annular internal surface and said sealing ring and axially between said one sealing member and a selected one of said inner seal housing forward face and said inner seal housing aft face.

7. The system of claim 1 further comprising a torque member positioned between said outer seal housing and said inner seal housing for preventing rotation of said inner seal housing relative to said outer seal housing.

8. A pressure balanced floating seal system positioned within a structure about a rotating shaft, comprising:

a cylindrical outer seal housing positioned within the structure, said outer seal housing having a cylindrical internal recessed region formed therein and a retaining flange extending into said internal recessed region;

a cylindrical inner seal housing having a forward face, an aft face and an annular internal surface defining a shaft aperture through said inner seal housing, said inner seal housing being positioned within said outer seal housing internal recessed region with said inner seal housing forward face being positioned proximate said outer seal housing retaining flange, said inner seal housing forward face having an intermediate seal retaining groove formed therein, said inner seal housing annular internal surface having a lubricant recess formed therein and thereabout, and at least two sealing member retaining grooves formed in said inner seal housing annular internal surface with one sealing member retaining groove formed axially forward of said lubricant recess and one sealing member retaining groove formed axially aft of said lubricant recess;

a circular intermediate seal having a first sealing radius from the axis of the rotating shaft and being retained by said intermediate seal retaining groove on said inner seal housing forward face between said inner seal housing and said outer seal housing at said retaining flange;

at least two sealing members with each sealing member being positioned in one said sealing member retaining groove, said sealing members having a second sealing radius from the axis of the rotating shaft and said second sealing radius being substantially the same as said first sealing radius; and a torque member positioned between said outer seal housing and said inner seal housing for preventing rotation of said inner seal housing relative to said outer seal housing, wherein said outer seal housing has a torque bolt mounting aperture formed therein, said inner seal housing has a torque bolt mounting bore therein, and said torque member comprises:

an elastomeric bushing positioned in said torque bolt mounting bore; and a torque bolt retained by said torque bolt mounting aperture and being received in said torque bolt mounting bore, said torque bolt having clearance from the base of said torque bolt mounting bore for allowing radial repositioning of said inner seal housing.

9. A pressure balanced floating seal system positioned within a structure about a rotating shaft, comprising:

a cylindrical outer seal housing positioned within the structure, said outer seal housing having a cylindrical internal recessed region formed therein, a retaining flange extending into said internal recessed region, and a retaining groove formed in an aft portion of said internal recessed region;

a cylindrical inner seal housing having a forward face, an aft face, an annular internal surface defining a shaft aperture through said inner seal housing and a sealing flange extending inward from the forward face of said inner seal housing, said inner seal housing being positioned within said outer seal housing internal recessed region with said inner seal housing forward face being positioned proximate said outer seal housing retaining flange, said inner seal housing annular internal surface having a lubricant recess formed therein and thereabout, and at least two sealing member retaining grooves formed in said inner seal housing annular internal surface with one sealing member retaining groove formed axially forward of said lubricant recess and one sealing member retaining groove formed axially aft of said lubricant recess;

a retaining ring positioned in said retaining groove of said outer seal housing and preventing said inner seal housing from moving in an aft direction;

a circular intermediate seal having a first sealing radius from the axis of the rotating shaft and being retained on said inner seal housing forward face between said inner seal housing sealing flange and said outer seal housing at said retaining flange;

at least two sealing members with each sealing member being positioned in one said sealing member retaining groove, said sealing members having a second sealing radius from the axis of the rotating shaft and said second sealing radius being substantially the same as said first sealing radius; and a sealing ring having a collar with a third radius to the forward end of said sealing ring and a sealing section with a fourth radius to the aft end of said sealing ring, said sealing ring being fixed and sealed on the rotating shaft, said inner seal housing sealing flange being positioned about said sealing ring collar, said inner seal housing annular internal surface being positioned about said sealing ring sealing section and said at least two sealing members sealing against said sealing ring.

10. The system of claim 9 wherein said inner seal housing has an oil fill aperture formed therein extending from said inner seal housing aft face in communication with said lubricant recess and said system further comprising a plug positioned in said oil fill aperture proximate said aft face.

11. The system of claim 9 further comprising a torque member positioned between said outer seal housing and said inner seal housing for preventing rotation of said inner seal housing relative to said outer seal housing.

12. The system of claim 11 wherein said torque member comprises:

said outer seal housing having a torque bolt mounting aperture formed therein;

said inner seal housing having a torque bolt mounting bore therein;

an elastomeric bushing positioned in said torque bolt mounting bore; and a torque bolt retained by said torque bolt mounting aperture and being received in said torque bolt mounting bore, said torque bolt having clearance from the base of said torque bolt mounting bore for allowing radial repositioning of said inner seal housing.

* * * * *